US007642951B2

(12) United States Patent
Onorato

(10) Patent No.: US 7,642,951 B2
(45) Date of Patent: Jan. 5, 2010

(54) DUAL CHANNEL SPATIALLY ADAPTIVE CFAR

(76) Inventor: James Onorato, 10 Ashford Dr., Lake Grove, NY (US) 11755

( * ) Notice: Subject to any disclaimer, the term of this patent is extended or adjusted under 35 U.S.C. 154(b) by 98 days.

(21) Appl. No.: 11/273,717

(22) Filed: Nov. 14, 2005

(65) Prior Publication Data

US 2006/0232464 A1 Oct. 19, 2006

Related U.S. Application Data

(60) Provisional application No. 60/627,652, filed on Nov. 12, 2004.

(51) Int. Cl.
*G01S 7/292* (2006.01)
(52) U.S. Cl. .......................... 342/93; 342/159
(58) Field of Classification Search .................... 342/93
See application file for complete search history.

(56) References Cited

U.S. PATENT DOCUMENTS

| | | | | |
|---|---|---|---|---|
| 3,775,770 A | * | 11/1973 | Dillard et al. | 342/378 |
| 4,012,627 A | * | 3/1977 | Antoniak | 708/322 |
| 4,137,532 A | * | 1/1979 | Taylor et al. | 342/93 |
| 4,503,432 A | * | 3/1985 | Bailey | 342/93 |
| 4,635,217 A | * | 1/1987 | O'Connor et al. | 702/193 |
| 4,646,254 A | * | 2/1987 | O'Connor et al. | 702/193 |
| 4,649,394 A | * | 3/1987 | Minker et al. | 342/94 |
| 4,958,141 A | * | 9/1990 | Engelsman | 340/146.2 |
| 5,179,712 A | * | 1/1993 | Abboud | 712/300 |
| 5,457,462 A | * | 10/1995 | Mitsumoto et al. | 342/93 |
| 5,499,030 A | * | 3/1996 | Wicks et al. | 342/93 |
| 5,644,315 A | * | 7/1997 | Long | 342/93 |
| 5,694,342 A | * | 12/1997 | Stein | 702/190 |
| 5,706,013 A | * | 1/1998 | Melvin et al. | 342/159 |
| 5,764,182 A | * | 6/1998 | Durand | 342/188 |
| 5,847,675 A | * | 12/1998 | Poinsard | 342/81 |
| 6,226,321 B1 | * | 5/2001 | Michels et al. | 375/227 |
| 6,717,545 B2 | * | 4/2004 | Dizaji et al. | 342/93 |
| 6,771,723 B1 | * | 8/2004 | Davis et al. | 375/350 |
| 7,193,558 B1 | * | 3/2007 | Gerlach et al. | 342/195 |
| H002222 H | * | 8/2008 | Rangaswamy et al. | 342/159 |

OTHER PUBLICATIONS

Nagarajan et al. "Modified Distribution Free CFAR Processor for Clutter Edges and Multi-Target Situations". IEEE Conference on Acoustics, Speech, and Signal Processing. vol. 9. Mar. 1984. pp. 498-501.*

(Continued)

*Primary Examiner*—Thomas H Tarcza
*Assistant Examiner*—Matthew M Barker
(74) *Attorney, Agent, or Firm*—Thomas A. O'Rourke; Bodner & O'Rourke, LLP

(57) ABSTRACT

A system for reducing CFAR loss due to sea clutter is disclosed. The system includes a first channel tuned for CFAR gain in a spatially correlated background and a second channel tuned for low CFAR loss in spatially uncorrelated backgrounds. Each of the channels employs a distribution free CFAR using rank ordered statistics to establish a constant false alarm rate. The output of each channel is fused by a hit correlation function and the stream of combined hits is processed by a target centroiding function.

18 Claims, 3 Drawing Sheets

OTHER PUBLICATIONS

Watts, Simon. "The Performance of Cell-Averaging CFAR Systems in Sea Clutter". The record on the IEEE 2000 International Radar Conference. May 7-12, 2000. pp. 398-403.*

Conte et al. "Asymptotically Optimum Radar Detection in Compound-Gaussian Clutter". IEEE Transactions on Aerospace and Electronic Systems. vol. 31, Issue 2. Apr. 1995. pp. 617-625.*

Nechval, Nicholas. "CFAR test using order statistics for target detection by radar with multiple resolution elements". Proc. SPIE. vol. 2662, 93. Jan. 1996. pp. 93-104.*

Nitzberg, Ramon. "Constant-False-Alarm-Rate Signal Processors for Several Types of Interference". IEEE Transactions on Aerospace and Electronic Systems. vol. AES-8, Issue 1. Jan. 1972. pp. 27-34.*

* cited by examiner

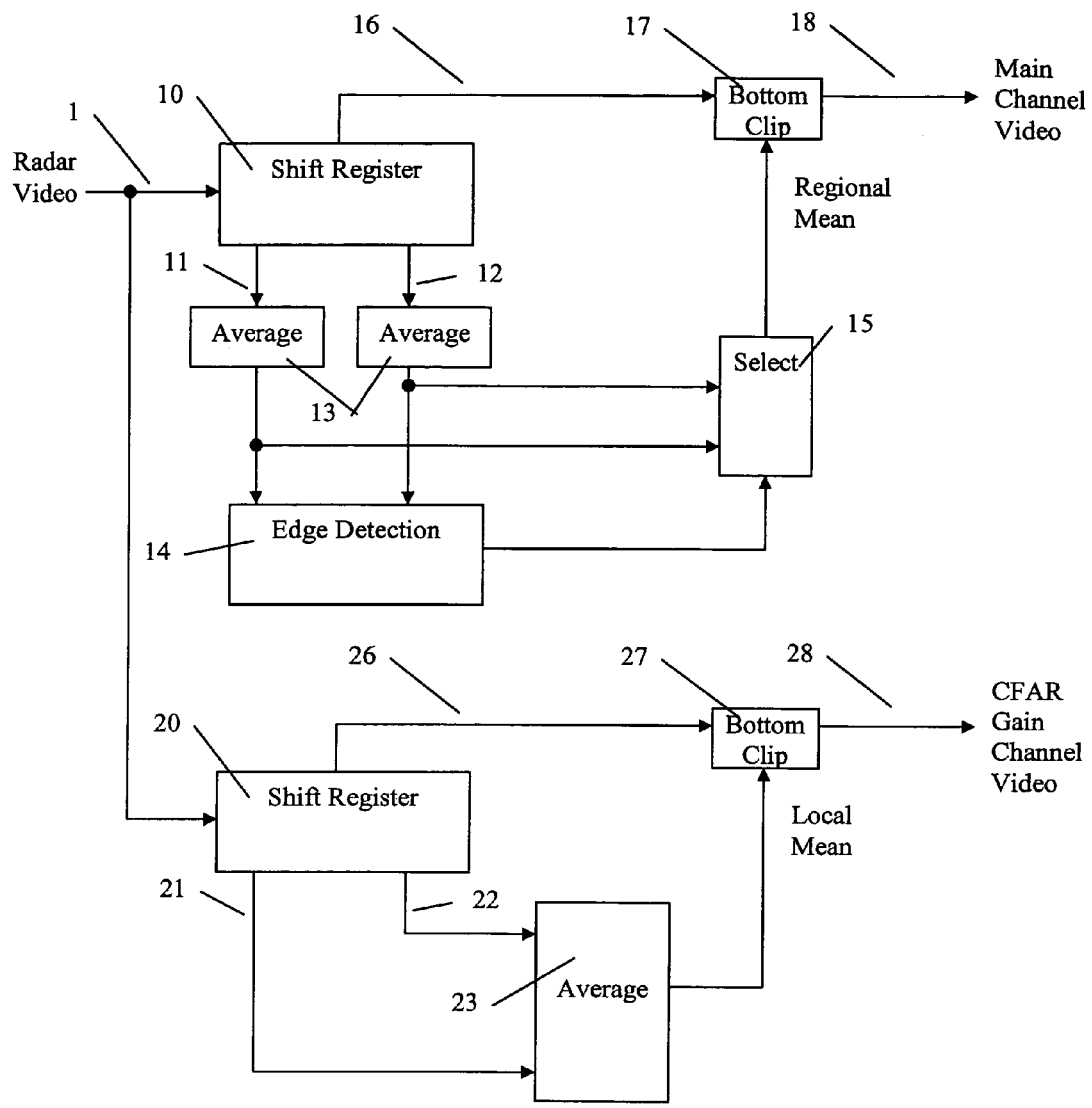
Figure 1a – Dual Channel Spatially Adaptive CFAR (Mean Removal Segment)

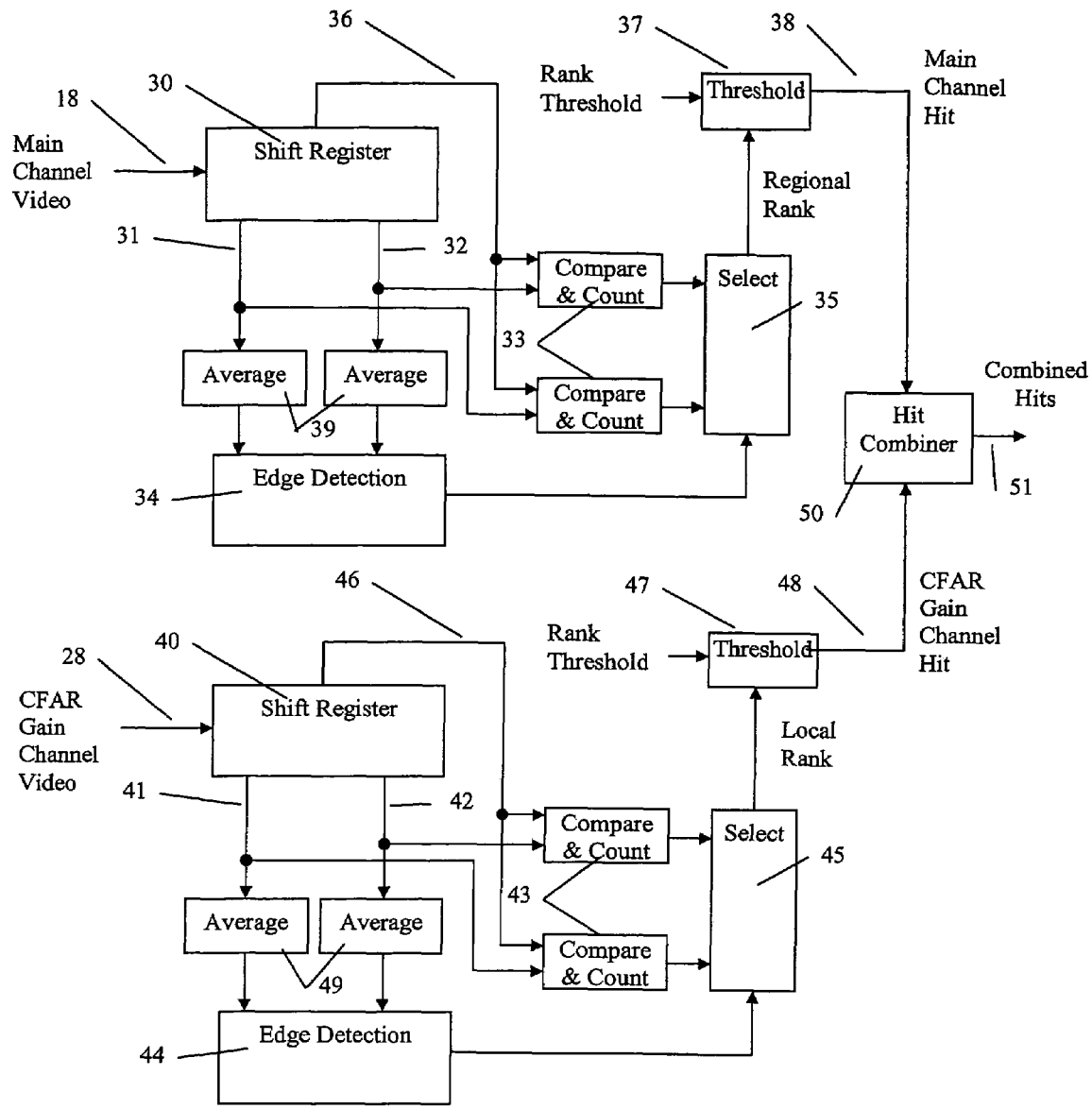
Figure 1b – Dual Channel Spatially Adaptive CFAR (Distribution Free CFAR Segment)

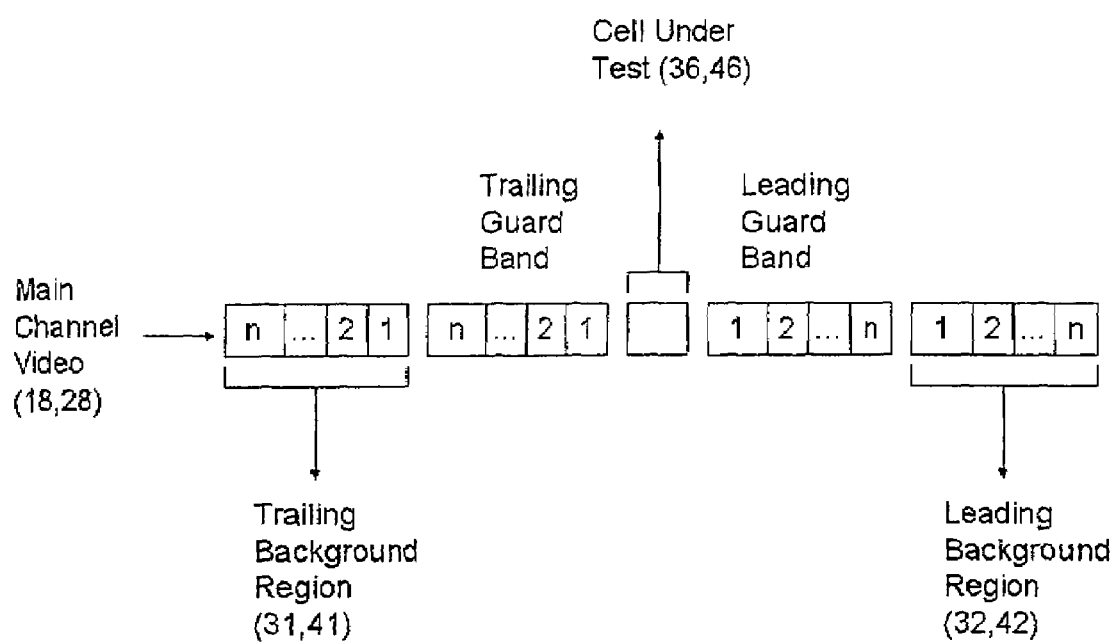
Figure 2 – Detailed Block Diagram of a Shift Register as seen in Figure 1b

DUAL CHANNEL SPATIALLY ADAPTIVE CFAR

This application claims priority on U.S. Provisional Patent Application Ser. No. 60/627,652 filed Nov. 12, 2004 the disclosures of which are incorporated herein by reference.

FIELD OF THE INVENTION

The present invention is directed to improvements in radar and in particular improvements in reducing CFAR loss due to sea clutter.

BACKGROUND OF THE INVENTION

Radar backscatter from an ocean surface is commonly referred to as sea clutter. Any radar backscatter not due to the scattering from an ocean surface can be considered a potential target. The amplitude statistics of clutter have been modeled by Rayleigh, log-normal, contaminated-normal, Weibull, log-Weibull and K-distributions. Maritime surveillance radar relies on non-coherent processing techniques and the amplitude statistics of the sea clutter backscatter determines radar sensitivity and false alarm performance.

In one type of surveillance radar system designed to detect low radar cross section targets such as periscopes or small watercraft against a background of sea clutter, high range resolution is applied to minimize sea clutter competing with the target. The scan rate is chosen to be sufficiently high to provide multiple observations while the target is present. The system sensitivity is set to provide a high probability of detecting small targets of interest while accepting a high likelihood of also detecting tens of thousands of false plot detections per radar scan from noise and sea clutter. The false plot detections are filtered out over the observation time using integration along-a-path techniques such as retrospective track-before-detect processing that are capable of operating in a high false activity rate environment without incurring miss-association errors that are typically encountered in Track-While-Scan systems. The retrospective track-before-detect process maintains a history of scan level detections over the observation time and integrates along prior velocity trajectories searching for persistent returns that are indicative of a real target. The plots from sea clutter and noise will have little correlation in their position from scan to scan, being "noise like" and will have a low probability of integrating up and passing the retrospective process. The end result is a track picture that is sufficiently clean of false and clutter tracks that it can be readily understood.

A key factor that determines the detection performance is the ability to provide a first threshold on each range/azimuth cell that maintains a near Constant False Alarm Rate to fit within the radars processing resources in the presence of an unknown statistical background. There are numerous Constant False Alarm Rate techniques in the literature that develop thresholds based on a measure of the background region around the cell under test using both parametric or non-parametric algorithms. The parametric CFAR requires knowledge of the underlying statistics while the non-parametric CFAR is distribution free. CFAR techniques are based on an interference background (noise and sea clutter) that is assumed to be spatially uncorrelated. Large background regions are typically used to minimize the CFAR loss (which is the loss between the ideal threshold and the one computed by the CFAR). A guard band is typically employed that separates the cell under test from the background region and prevents extended targets from entering the background region and affecting sensitivity. CFAR designed for spatially uncorrelated backgrounds will introduce a higher threshold in the upwind direction to adapt to the higher clutter levels returned.

Recent studies of sea clutter phenomenology by Watts and Ward suggest that at certain aspect angles relative to the wind the sea clutter is spatially correlated (upwind and downwind). CFAR techniques have been developed to take advantage of this property and they result in a significant CFAR gain (>5 dB) when compared to standard techniques that have a large background region. These CFAR gain techniques require that the background estimate be derived from a region very close to the cell under test and also that the background size be on the order of the spatial correlation interval. Since spatial correlations are on the order of 10 meters, the number of background cells is much less than what is typically used in traditional CFAR designed for low CFAR loss. Therefore, CFAR designed for CFAR gain in correlated backgrounds will have high CFAR loss in uncorrelated backgrounds such as crosswind and noise limited conditions. Another problem is that CFAR gain techniques have problems with extended targets since the background measurement is taken with virtually no guard band.

To mitigate this problem, the current method is to build a clutter map where the statistics of each region are measured over time. The appropriate CFAR parameters are applied in each region. The problem with this approach is that it takes time to develop the clutter map since sufficient averaging is required to accurately characterize the clutter backscatter; the CFAR loss is higher because clutter variations within a clutter map cell are not tolerated, there are discontinuities at the clutter map cell boundaries and the clutter map solution still does not address the detection of extended targets in regions where CFAR gain techniques are applied.

OBJECTS OF THE INVENTION

It is an object of the present invention to provide improvements in radar systems.

It is also an object of the present invention to provide improvements in CFAR radar systems.

It is another object of the invention to provide additional target sensitivity in connection with current radar systems particularly upwind, in higher sea states and from higher platform altitudes.

It is a further object of the invention to eliminate most CFAR loss in a radar system so that enhanced target detection performance can be achieved at all aspect angles relative to the wind direction.

It is a still further object of the invention to provide a dual channel spatially adaptive constant false alarm rate detection method, system and apparatus.

SUMMARY OF THE INVENTION

The present invention is directed to a dual channel spatially adaptive constant false alarm rate detection method, apparatus and system. The present invention provides CFAR gain in spatially correlated sea clutter and low CFAR loss in uncorrelated sea clutter. The present invention is capable of providing a means of detecting targets of a plurality of sizes from small point targets to large extended targets. Small point targets include but are not limiter to targets of the size of a periscope, raft and person in the water, etc. Larger extended targets include but are not limited to large surface ships, commercial vessels and combatants, etc. Optimum detection sensitivity in sea clutter environments is obtained in the present invention without sacrificing the ability to simultaneously detect small point target and large extended targets. The present invention has the ability to adapt automatically to sea clutter variations with look angle relative to the wind/swell direction.

The dual channel spatially adaptive CFAR has one channel (CFAR Gain Channel) tuned for CFAR gain and this channel uses a small guard band (1 to about 10 cells) and a small background region (2 to about 10 cells). The second channel (Main Channel) is tuned for low CFAR loss in uncorrelated backgrounds and uses a large guard band (about 100 to about 400 cells) and a large background region (about 100 to about 1000 cells).

The mean level subtraction in the CFAR gain channel follows the spatial correlation and establishes low thresholds (high sensitivity) in regions where there is low sea clutter backscatter over a spatially correlated interval. Each channel employs a distribution free (DF) CFAR using rank ordered statistics to establish a constant false alarm rate while the probability-of-detection (Pd) varies in each channel depending on the background statistics.

For the case where the background is spatially correlated, the CFAR Gain Channel provides the best probability of detection (Pd). For the case of uncorrelated backgrounds and extended targets, the Main Channel provides the best Pd. The output of each channel is fused by a hit correlation function resulting in a stream of combined hits to be processed by the target centroiding function. With the DF property holding a constant false alarm rate, the hit correlation function is performed using a simple range association process where detections from either channel are "or'ed" to form combined hits. The incorporation of parallel channels has a small impact on overall false alarm rate however since the false alarms from the two channels are highly correlated so the combined false alarm rate after the fusion process is much less than two times the single channel false alarm rate. Therefore, the loss associated with the parallel channels is low.

BRIEF DESCRIPTION OF THE DRAWINGS

FIG. 1 is a schematic Dual Channel Spatially Adaptive CFAR

FIG. 2 shows a detailed block diagram of a shift register as seen in FIG. 1b.

DETAILED DESCRIPTION OF THE INVENTION

The following is an example of one embodiment of the present invention. The following describes a method, system and apparatus for implementing CFAR gain in correlated sea clutter while maintaining low CFAR loss in uncorrelated background areas. The embodiment also maintains the ability to simultaneously detect large targets and small targets as well as detect anomalies in the background region caused by land returns and nearby target returns. The method is applicable towards a wide range of maritime surveillance radars as long as the range resolution is sufficiently small relative to the sea clutter spatial correlation.

An example of the present invention is illustrated in FIG. 1. FIG. 1 shows two parallel processing channels performed in XILFNX on the Signal Processor Interface (SPI) card. The input radar video signal 1 is applied to two or more shift registers 10 and 20. One shift register 10 is sized to cover a large regional area while a second shift register 20 is sized to cover the local region. Shift register 10 is preferably divided into 5 segments. Segment #1 12 is the leading background region. Segment#2 is the leading guard band region. Segment#3 16 is the cell under test. Segment#4 is the trailing guard band region and Segment#5 11 is the trailing background region. Typically the background regions are sized large enough to provide low CFAR Loss and small enough to control contamination from large targets that may affect sensitivity. The guard region is sized to fit a large surface target to avoid self-cancellation. For example a guard region of 192 cells and a background region of 128 cells on each side with a 5 ft range cell avoids self cancellation for targets up to 960 ft long (192×5'); maintains full sensitivity in dense target environments as long as two extended targets are separated by at least 2565 ft (192+1+192+128×5') and results in a CFAR loss of less than 1 dB.

The cells in each background region 11 and 12 are independently averaged 13. The averages are tested by the Edge Detection function 14 and if there is a large imbalance the background region then the lower average is selected 13. If both averages are within a range dependent limit then they are both selected and averaged together by 13 to produce the Regional Mean. A bottom clip function 17 subtracts the Regional Mean from the cell under test 16 and clips negative numbers to a zero value producing the Main Channel Video 18.

Shift register 20 is sized to cover a local area that is on the order of the sea clutter spatial correlation. Shift register 20 is divided into preferably 6 segments. Segment #1 22 is the leading background region. Segment #2 is the leading guard band region. Segment #3 26 is the cell under test. Segment #4 is the trailing guard band region and Segment #5 21 is the trailing background region. Typically the background regions are range from 2 to 10 cells depending on radar resolution and the guard region is set to insure that background region is within the clutter spatial correlation distance of the cell under test. It will be appreciated by those skilled in the art that other numbers of cells are possible. Segment #6 is set so that the cell under test 26 is time aligned with 16.

The cells in each background region 21 and 22 are averaged 23 to produce a Local Mean. A bottom clip function 27 subtracts the Local Mean from the cell under test 26 and clips negative numbers to a zero value producing the CFAR Gain Channel Video 28.

The Main Channel Video 18 is applied to Shift Register 30 and the CFAR Gain Channel Video 28 is applied to Shift Register 40. Both Shift Registers 30 and 40 are sized the generally the same and each preferably has 5 Segments. Segment #1 32 & 42 is the leading background region. Segment #2 is the leading guard band region. Segment #3 36 & 46 is the cell under test. Segment #4 is the trailing guard band region and Segment#5 31 & 41 is the trailing background region. Typically the background regions are 256 cells each but other numbers of cells are possible. The guard region is sized to fit a large surface target to avoid self-cancellation. Each cell in the background regions of shift register 30 are compared to the cell under test 36 and the number of background cells that are greater than the cell under test 36 are counted separately 33 for each background region. Each cell in the background region is also averaged 39 and the averages are tested by the Edge Detection function 34. The Edge Detection function tests for a large imbalance (about 1 to about 3 dB) between the two background regions and when the condition is detected, the lower count 33 is selected 35. This insures that sensitivity is not reduced in the presence of land or a large target. The Edge Detection function includes a range dependent compensation factor for the $R^4$ variation between the leading and trailing averages. If both averages are within a range dependent limit then both counts 33 are selected and summed to produce the Regional Rank. Therefore for the case when there is no edge detect, the Regional Rank is the number of background cells that are greater than the cell under test. A Main Channel Hit is declared if the Regional Rank is less than the Rank Threshold 37. The Rank Threshold and the Background size establish the false alarm rate. For example a Rank Threshold of 6 and a total Background size of 512 produces a constant false alarm rate of $6/512=1.2\%$. A wide range of other values will also provide the desired false alarm rate. For the case when there is an edge detect, the background 31 or 32 associated with the lower average 39 is selected and the Regional Rank is the number of background cells that are greater than the cell under test. When an edge is detected 34, the Rank Threshold is divided by 2 to maintain a constant false alarm rate when detecting targets close to land and in the vicinity of large surface ships.

In the CFAR Gain channel, each cell in the background regions of shift register 40 are compared to the cell under test 46 and the number of background cells that are greater than the cell under test 46 are counted separately 43 for each background region. Each cell in the background region is also averaged 49 and the averages are tested by the Edge Detection function 44. If there is a large imbalance between the two background regions, then the lower count 43 is selected 45. If both averages are within a range dependent limit then both counts 43 are selected to produce the Regional Rank. A CFAR Gain Channel Hit is declared if the Regional Rank is less than the Rank Threshold 47. The Rank Threshold 47 is generally set to the same value as Rank Threshold 37 however each can be adjusted independently to set the sensitivity of each channel.

Main Channel Hits and CFAR Gain Channel Hits are combined 50 preferably using an "or-ing" function to produce the final Combined Hits output 51. The Target Extraction and Centroiding function then typically processes the Combined Hits to produce Radar Plot data for the Track-Before-Detect function. Each channel provides a constant false alarm rate due to the Distribution Free (DF) property of the rank ordered detector 37 & 47. The combined false alarm rate is somewhere between 1× to 2× the single channel false alarm rate depending on the correlation between the channels. A potential 2:1 variation in false alarm rate is manageable by the downstream processing. By holding the total false alarm rate within a 2:1 range, the target detections produced by each channel can be simply or'ed by correlating each channel on a range cell basis 50. The channel with the best sensitivity for the background therefore, provides the detection. If the target is detected in both channels, the correlation process combines them into a single hit 50.

The detection capabilities of each channel is summarized below:

Main Channel detects the following:
Large targets
Small targets in uncorrelated backgrounds
Small targets in low sea state correlated backgrounds
Sea Spikes
Noise
CFAR Gain Channel detects the following:
Small targets in correlated backgrounds
Sea Spikes
Noise
Portions of large targets Portions of large targets from the CFAR Gain Channel that are within the same range interval as the Main Channel are fused into a single hit 50. Likewise for small targets, sea spikes and noise detections. Each hit message 51 to the Target Extractor includes a label to identify which channel the detection was made. This label is used to set appropriate parameters in subsequent software processing steps.

The preferred parameters for each channel are as follows:

Main Channel
  Mean Level Subtract Background 128 cells on each side of the cell under test
  DF Background is 256 cells on each side of the cell under test
  Guard band set to pass large targets in both mean removal and DF segments
  Provides detection of small to large targets
  Background and guard band set for regional processing
  Small targets detected in moderate sea clutter and under noise limited conditions
  Edge detect function maintains sensitivity near lass mass returns and large surface targets CFAR Gain Channel
  Mean Level Subtract Background up to 2 cells on each side of the cell under test depending on the radar resolution
  DF Background is 256 cells on each side of the cell under test
  Guard band set the same as main channel DF
  Provides detection of small targets
  Background and guard band set for local processing
  Provides CFAR gain in correlated sea clutter
  Higher CFAR loss than main channel in uncorrelated backgrounds
  Mean subtraction edge detect is not required due to small background size Hit Correlation Function
  The Hit Correlation combines the detections from the two channels into a composite hit.

What is claimed is:

1. An apparatus for providing a rank threshold and regional rank for a radar system, the apparatus comprising:
  a signal processor configured to implement a spatially adaptive distribution free CFAR, said CFAR comprising a first processing channel and a second processing channel, said first processing channel being tuned for CFR gain in a spatially correlated background using a guard band of 1 or more cells and a background region of a plurality of cells and said second processing channel being tuned for low CFAR loss in a spatially uncorrelated background using a guard band having a number of cells greater than the number of cells in the guard band of said first channel and background region having a number of cells greater than the number of cells in the background region of said first channel;
said CFAR further comprising a means of establishing a rank threshold in said first and second channel processing channel and a means of establishing a regional rank.

2. The apparatus according to claim 1 wherein said first channel uses a guard band of about 1 to 10 cells.

3. The apparatus according to claim 2 wherein said first channel uses a background region of about 2 to 10 cells.

4. The apparatus according to claim 3 wherein said second channel uses a guard band of about 2 to 10 cells.

5. The apparatus according to claim 4 wherein said second channel uses a background region of about 100 to 1000 cells.

6. The apparatus according to claim 5 wherein a rank threshold is established in each channel.

7. The apparatus according to claim 6 wherein a regional rank is established by rank ordered statistics.

8. The apparatus according to claim 7 wherein the rank threshold and the regional rank are compared.

9. The apparatus according to claim 8 wherein a hit is established when the regional rank in one channel is less than the rank threshold in said channel.

10. The apparatus according to claim 9 wherein the hits in the first channel and the second channel are combined to produce a combined output.

11. The apparatus according to claim 10 wherein the hits are combined using an "or-ing" function.

12. An apparatus for providing a rank threshold and regional rank for a radar system, the apparatus comprising:
a signal processor configured to implement a spatially adaptive distribution free CFAR, said CFAR comprising a first processing channel and a second processing channel, said first processing channel being tuned for CFAR gain in a spatially correlated background with a background region of about 2 to 10 cells and said second processing channel being tuned for low CFAR loss in a spatially un correlated background with a background region of about 100 to about 1000 cells;
said CFAR further comprising a means of establishing a rank threshold in said first and second channel processing channel and a means of establishing a regional rank.

13. The apparatus according to claim 12 wherein a rank threshold is established in each channel.

14. The apparatus according to claim 13 wherein a regional rank is established by rank ordered statistics.

15. The apparatus according to claim 14 wherein the rank threshold and the regional rank are compared.

16. The apparatus according to claim 15 wherein a hit is established when the regional rank in one channel is less than the rank threshold in said channel.

17. The apparatus according to claim 16 wherein the hits in the first channel and the second channel are combined to produce a combined output.

18. The apparatus according to claim 17 wherein the hits are combined using an "or-ing" function.

* * * * *